United States Patent
Yoneyama et al.

(10) Patent No.: US 11,958,876 B2
(45) Date of Patent: Apr. 16, 2024

(54) CARBACYCLIC PHOSPHATIDIC ACID COMPOUND

(71) Applicant: OTSUKA CHEMICAL CO., LTD., Osaka (JP)

(72) Inventors: Shin Yoneyama, Tokushima (JP); Hiroki Okazaki, Tokushima (JP)

(73) Assignee: OTSUKA CHEMICAL CO., LTD., Osaka (JP)

(*) Notice: Subject to any disclaimer, the term of this patent is extended or adjusted under 35 U.S.C. 154(b) by 0 days.

(21) Appl. No.: 17/787,522

(22) PCT Filed: Dec. 23, 2020

(86) PCT No.: PCT/JP2020/048077
§ 371 (c)(1),
(2) Date: Jun. 20, 2022

(87) PCT Pub. No.: WO2021/132297
PCT Pub. Date: Jul. 1, 2021

(65) Prior Publication Data
US 2022/0396594 A1 Dec. 15, 2022

(30) Foreign Application Priority Data
Dec. 23, 2019 (JP) .................. 2019-231247

(51) Int. Cl.
*C07F 9/6574* (2006.01)
(52) U.S. Cl.
CPC ................. *C07F 9/65742* (2013.01)
(58) Field of Classification Search
CPC .................................................. C07F 9/65742
See application file for complete search history.

(56) References Cited

U.S. PATENT DOCUMENTS

| | | | |
|---|---|---|---|
| 2006/0122155 A1 | 6/2006 | Murofushi | |
| 2009/0326256 A1 | 12/2009 | Murofushi | |
| 2014/0309194 A1 | 10/2014 | Murofushi | |
| 2017/0233421 A1 | 8/2017 | Yuasa | |

FOREIGN PATENT DOCUMENTS

| | | |
|---|---|---|
| JP | 2004-010582 A | 1/2004 |
| JP | 2008-222643 A | 9/2008 |
| WO | 03/104246 A1 | 12/2003 |
| WO | 2008/081580 A1 | 7/2008 |
| WO | 2013/069404 A1 | 5/2013 |
| WO | 2013/161978 A1 | 10/2013 |
| WO | 2016/024605 A1 | 2/2016 |

OTHER PUBLICATIONS

International Search Report for International Application No. PCT/JP2020/048077 dated Feb. 9, 2021 (2 sheets).
A. Uchiyama, et al.; "Inhibition of transcellular tumor cell migration and metastasis by novel carba-derivatives of cyclic phosphatidic acid"; Biochimica et Biophysica Acta; 2007; vol. 1771; pp. 103-112 (10 pages).
J. Dubois, et al.; "Synthesis of 5,5'-dihydroxyleucine and 4-fluoro 5,5'-dihydroxyleucine, the reduction products of 4-carboxyglutamic and 4-carboxy-4-fluoroglutamic acids"; Tetrahedron; 1991; vol. 47; No. 6; pp. 1001-1012 (12 pages).
Supplementary European Search Report for European Patent Application No. 20908311.2 dated Jan. 2, 2024 (8 sheets).

*Primary Examiner* — Laura L Stockton
(74) *Attorney, Agent, or Firm* — Kratz, Quintos & Hanson, LLP

(57) ABSTRACT

Provided is a degradation inhibitor that delays the progress of the degradation reaction of 2ccPA and has an excellent stabilization effect by using a carbacyclic phosphatidic acid compound represented by formula (1):

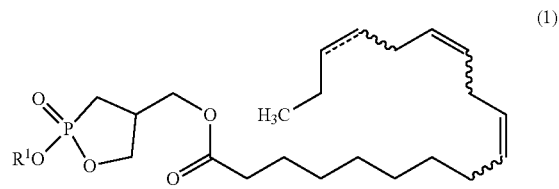

(1)

wherein $R^1$ represents hydrogen, alkali metal, alkyl, arylalkyl, or aryl; bonds indicated by solid and dotted lines represent single or double bonds; wavy lines represent single bonds; and when the single bond is adjacent to a double bond, the steric configuration is E-configuration, Z-configuration, or any mixture thereof.

12 Claims, No Drawings

CARBACYCLIC PHOSPHATIDIC ACID COMPOUND

TECHNICAL FIELD

The present invention relates to a carbacyclic phosphatidic acid compound.

BACKGROUND ART

As a cyclic phosphonic acid sodium salt, a sodium salt of 9-octadecenoic acid (9Z)-(2-hydroxy-2-oxo-2$\lambda^5$-1,2-oxaphosphoran-4-yl)methyl ester is a compound, typically referred to as "2ccPA."

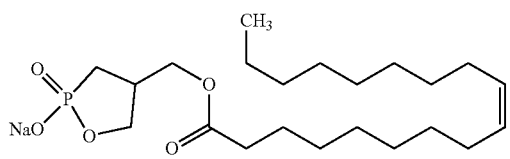

2ccPA is known to have a potent analgesic action (see, for example, PTL 1) and is also expected to serve as an anti-cancer agent because of its infiltration-inhibitory activity on cancer cells (see, for example, PTL 2), an osteoarthritis therapeutic agent because of its accelerated production of hyaluronic acid (see, for example, PTL 3), a hair growth agent (see, for example, PTL 4), or other agents.

Various methods for synthesizing 2ccPA are known. For example, 2ccPA has been produced by the production method shown in the following reaction scheme-1 (see, for example, PTL 2, PTL 5, NPL 1, and NPL 2).

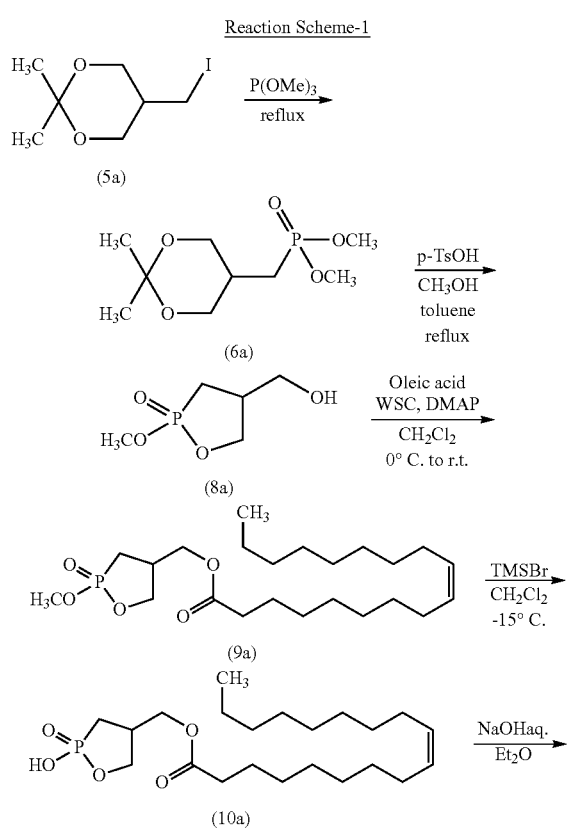

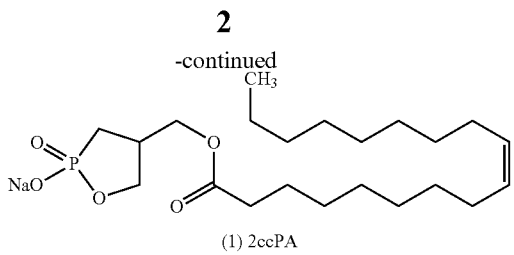

(1) 2ccPA

On the other hand, a method for producing 2ccPA as a high-purity crystal is also known (see, for example, PTL 6).

CITATION LIST

Patent Literature

PTL 1: WO2008/081580
PTL 2: JP2004-010582A
PTL 3: WO2013/069404
PTL 4: WO2013/161978
PTL 5: WO03/104246
PTL 6: WO2016/024605

Non-Patent Literature

NPL 1: Biochimica et Biophysica Acta, 2007, 1771, pp. 103-112
NPL 2: Tetrahedron, 1991, Vol. 47, No. 6, pp. 1001-1012

SUMMARY OF INVENTION

Technical Problem

However, even a high-purity crystal of 2ccPA rapidly degrades when stored mainly in the air or under high temperature. For this reason, there has been a demand for degradation inhibitors that can inhibit the degradation of 2ccPA and have an excellent stabilization effect.

The present invention was made to solve the above problem, and an object thereof is to provide a degradation inhibitor that delays the progress of the degradation reaction of 2ccPA and has an excellent stabilization effect.

Solution to Problem

The present inventors conducted extensive research to achieve the above object. As a result, the present inventors found that carbacyclic phosphatidic acid compounds having a linoleic acid unit or a linolenic acid unit have an excellent degradation inhibition effect on 2ccPA having an oleic acid unit. The present invention has been completed upon further research based on this finding. Specifically, the present invention includes the following configurations.

Item 1. A carbacyclic phosphatidic acid compound represented by formula (1):

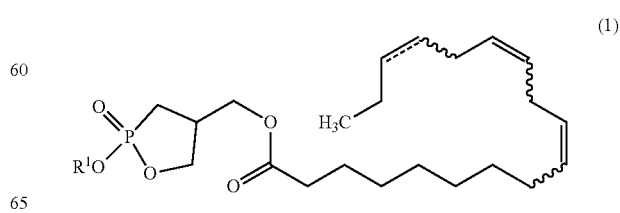

wherein $R^1$ represents hydrogen, alkali metal, alkyl, arylalkyl, or aryl; bonds indicated by solid and dotted lines represent single or double bonds; wavy lines represent single bonds; and when the single bond is adjacent to a double bond, the steric configuration is E-configuration, Z-configuration, or any mixture thereof.

Item 2. The carbacyclic phosphatidic acid compound according to Item 1, which is represented by formula (1A):

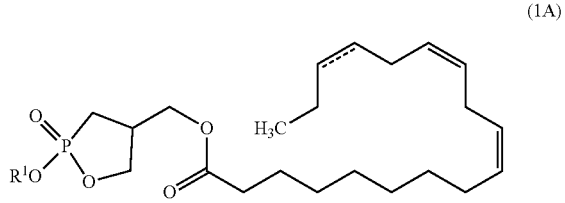

(1A)

wherein $R^1$ is as defined above, and bonds indicated by solid and dotted lines represent single or double bonds.

Item 3. The carbacyclic phosphatidic acid compound according to Item 1 or 2, wherein $R^1$ represents hydrogen or alkali metal.

Item 4. A method for producing the carbacyclic phosphatidic acid compound according to any one of Items 1 to 3, the method comprising step (A) of reacting a cyclic phosphonic acid compound represented by formula (3):

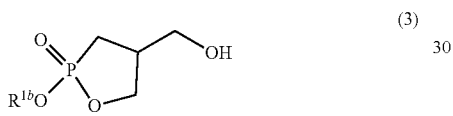

(3)

wherein $R^{1b}$ represents alkyl, arylalkyl, or aryl; and a linoleic acid compound and/or a linolenic acid compound to obtain a carbacyclic phosphatidic acid compound represented by formula (1-2):

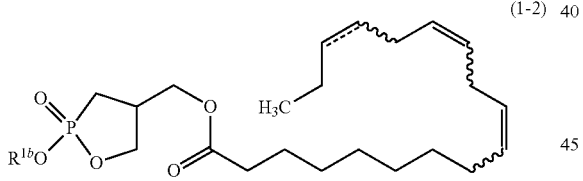

(1-2)

wherein $R^{1b}$ is as defined above; bonds indicated by solid and dotted lines represent single or double bonds; wavy lines represent single bonds; and when the single bond is adjacent to a double bond, the steric configuration is E-configuration, Z-configuration, or any mixture thereof.

Item 5. The production method according to Item 4, further comprising step (B) of reacting the carbacyclic phosphatidic acid compound represented by formula (1-2) and an alkali metal halide to obtain a carbacyclic phosphatidic acid compound represented by formula (1-1):

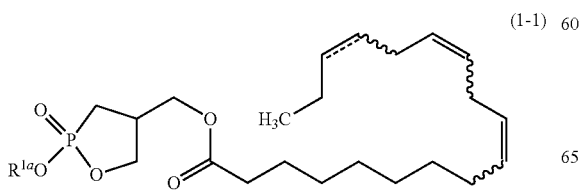

(1-1)

wherein $R^{1a}$ represents hydrogen or alkali metal; bonds indicated by solid and dotted lines represent single or double bonds; wavy lines represent single bonds; and when the single bond is adjacent to a double bond, the steric configuration is E-configuration, Z-configuration, or any mixture thereof.

Item 6. A degradation inhibitor comprising the carbacyclic phosphatidic acid compound according to Item 3.

Item 7. The degradation inhibitor according to Item 6, which is a degradation inhibitor of a cyclic phosphonic acid compound.

Item 8. The degradation inhibitor according to Item 7, wherein the cyclic phosphonic acid compound is represented by formula (2):

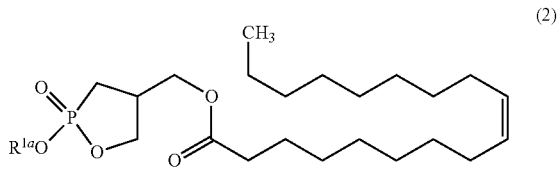

(2)

wherein $R^{1a}$ represents hydrogen or alkali metal.

Item 9. A composition comprising:
a carbacyclic phosphatidic acid compound represented by formula (1-1):

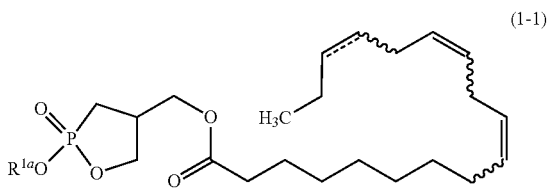

(1-1)

wherein $R^{1a}$ represents hydrogen or alkali metal; bonds indicated by solid and dotted lines represent single or double bonds; wavy lines represent single bonds; and when the single bond is adjacent to a double bond, the steric configuration is E-configuration, Z-configuration, or any mixture thereof; and
a cyclic phosphonic acid compound represented by formula (2):

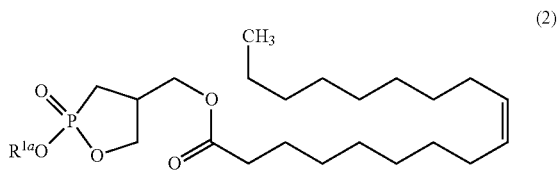

(2)

wherein $R^{1a}$ is as defined above.

Item 10. The composition according to Item 9, wherein the carbacyclic phosphatidic acid compound is contained in an amount of 0.001 to 0.44 parts by mass based on 100 parts by mass of the cyclic phosphonic acid compound.

Item 11. The composition according to Item 9 or 10, which is a pharmaceutical composition.

Advantageous Effects of Invention

The carbacyclic phosphatidic acid compounds of the present invention include a carbacyclic phosphatidic acid compound represented by formula (1-1) wherein $R^1$ represents hydrogen or alkali metal, and a carbacyclic phosphatidic acid compound represented by formula (1-2) wherein $R^1$ represents alkyl, arylalkyl, or aryl.

Of these, the carbacyclic phosphatidic acid compound represented by formula (1-1) can inhibit the degradation of 2ccPA, and is thus useful as a degradation inhibitor. Further, the carbacyclic phosphatidic acid compound represented by formula (1-2) is useful as an intermediate of the carbacyclic phosphatidic acid compound represented by formula (1-1).

DESCRIPTION OF EMBODIMENTS

In this specification, the term "comprise" includes the concept of "comprise," "consist essentially of," and "consist of." Further, in this specification, the numerical range indicated by "A to B" means A or more and B or less, unless otherwise specified.

1. Carbacyclic Phosphatidic Acid Compound

The carbacyclic phosphatidic acid compound of the present invention is a compound represented by formula (1):

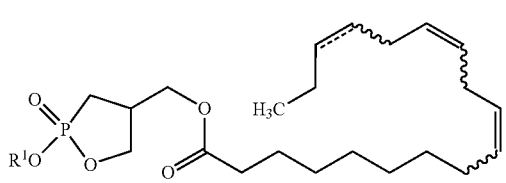

(1)

wherein $R^1$ represents hydrogen, alkali metal, alkyl, arylalkyl, or aryl; bonds indicated by solid and dotted lines represent single or double bonds; wavy lines represent single bonds; and when the single bond is adjacent to a double bond, the steric configuration is E-configuration, Z-configuration, or any mixture thereof.

In formula (1), bonds indicated by solid and dotted lines represent single or double bonds. That is, the carbacyclic phosphatidic acid compounds represented by formula (1) include compounds represented by the following formulas (1-a) and (1-b):

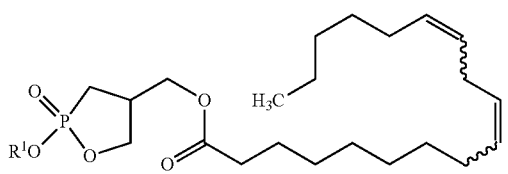

(1-a)

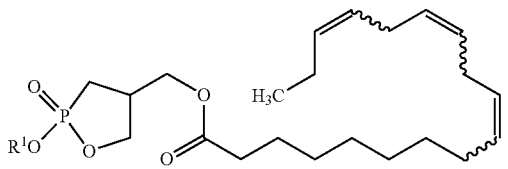

(1-b)

wherein $R^1$ is as defined above; wavy lines represent single bonds; and when the single bond is adjacent to a double bond, the steric configuration is E-configuration, Z-configuration, or any mixture thereof. Of these, the carbacyclic phosphatidic acid compound represented by formula (1-a) is preferable in terms of ease of synthesis, the stabilization effect on cyclic phosphonic acid compounds (2ccPA etc.) described later, and the like.

Next, in formula (1), wavy lines represent single bonds, and when the single bond is adjacent to a double bond, the steric configuration is E-configuration, Z-configuration, or any mixture thereof. That is, all of the double bonds in the carbacyclic phosphatidic acid compound represented by formula (1) may have cis- and trans-configurations. Therefore, in the case of the carbacyclic phosphatidic acid compound represented by formula (1-a), positions 8 and 11 having double bonds (both show the positions when the carbon atom (α-carbon) adjacent to the carbonyl group is taken as position 1; the same below) can be, in this order, cis-cis, cis-trans, trans-cis, or trans-trans. In the case of the carbacyclic phosphatidic acid compound represented by formula (1-b), positions 8, 11, and 14 having double bonds can be, in this order, cis-cis-cis, cis-cis-trans, cis-trans-cis, trans-cis-cis, cis-trans-trans, trans-cis-trans, trans-trans-cis, or trans-trans-trans. Of these, in terms of ease of synthesis, the stabilization effect on cyclic phosphonic acid compounds (2ccPA etc.) described later, and the like, all of the double bonds are preferably in cis-configurations. That is, preferable is a carbacyclic phosphatidic acid compound represented by formula (1A):

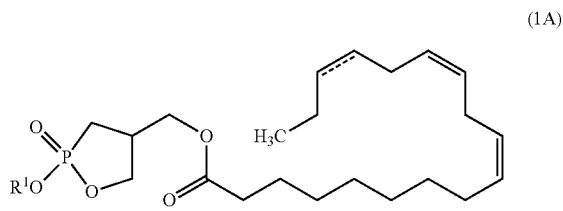

(1A)

wherein $R^1$ is as defined above, and bonds indicated by solid and dotted lines represent single or double bonds.

In formula (1), examples of the alkali metal represented by $R^1$ include lithium, sodium, potassium, and the like. Of these, sodium is preferable in terms of ease of synthesis, the stabilization effect on cyclic phosphonic acid compounds (2ccPA etc.) described later, and the like.

In formula (1), examples of the alkyl represented by $R^1$ include linear or branched alkyl having 1 to 10 carbon atoms. Specific examples include methyl, ethyl, n-propyl, isopropyl, n-butyl, isobutyl, sec-butyl, tert-butyl, n-pentyl, n-hexyl, n-heptyl, n-octyl, n-nonyl, and the like. Of these, alkyl having 1 to 6 carbon atoms is preferable, alkyl having 1 to 4 carbon atoms is more preferable, and methyl, ethyl, isopropyl, etc. are even more preferable, in terms of ease of synthesis, the stabilization effect on cyclic phosphonic acid compounds (2ccPA etc.) described later, and the like.

The alkyl may contain 1 to 5 substituents, and particularly 1 to 3 substituents, such as halogen atoms (e.g., fluorine, chlorine, and bromine), alkoxy having 1 to 6 carbon atoms, and nitro.

In formula (1), examples of the arylalkyl represented by $R^1$ include arylalkyl having 7 to 16 carbon atoms (the aryl moiety has 6 to 10 carbon atoms, and the alkyl moiety has 1 to 6 carbon atoms). Specific examples include benzyl; 1-phenyl ethyl, 2-phenyl ethyl; 1-phenyl propyl, 2-phenyl propyl, 3-phenyl propyl; 1-phenyl butyl, 2-phenyl butyl, 3-phenyl butyl, 4-phenyl butyl; and naphthyl methyl. Of these, the arylalkyl represented by $R^1$ is preferably arylalkyl having 7 to 11 carbon atoms, more preferably arylalkyl having 7 or 8 carbon atoms, and even more preferably benzyl, in terms of ease of synthesis, the stabilization effect on cyclic phosphonic acid compounds (2ccPA etc.) described later, and the like.

The aryl constituting the arylalkyl represented by $R^1$ may contain 1 to 5 substituents, and particularly 1 to 3 substituents, such as halogen atoms (e.g., fluorine, chlorine, and bromine), alkyl having 1 to 6 carbon atoms, alkoxy having 1 to 6 carbon atoms, and nitro.

In formula (1), examples of the aryl represented by $R^1$ include monocyclic, dicyclic, or more than dicyclic aryl. Specific examples include phenyl, naphthyl, anthryl, and phenanthryl. The aryl may contain 1 to 5 substituents, and particularly 1 to 3 substituents, such as halogen atoms (e.g., fluorine, chlorine, and bromine), alkyl having 1 to 6 carbon atoms, alkoxy having 1 to 6 carbon atoms, and nitro. Of these, substituted or unsubstituted phenyl is preferable in terms of ease of synthesis, the stabilization effect on cyclic phosphonic acid compounds (2ccPA etc.) described later, and the like.

The form of the carbacyclic phosphatidic acid compound of the present invention is not particularly limited. Examples include liquids, solids, crystals, and the like. Of these, crystals are preferable in terms of the stabilization effect on cyclic phosphonic acid compounds (2ccPA etc.) described later, and the like. The production method in the case of crystals is described later.

Regarding the carbacyclic phosphatidic acid compound of the present invention described above, the carbacyclic phosphatidic acid compound represented by formula (1-1) wherein $R^1$ represents hydrogen or alkali metal:

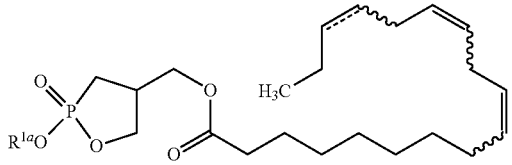

(1-1)

wherein $R^{1a}$ represents hydrogen or alkali metal; bonds indicated by solid and dotted lines represent single or double bonds; wavy lines represent single bonds; and when the single bond is adjacent to a double bond, the steric configuration is E-configuration, Z-configuration, or any mixture thereof; is useful as a degradation inhibitor that inhibits the degradation of cyclic phosphonic acid compounds. The target cyclic phosphonic acid compounds are described later.

On the other hand, the carbacyclic phosphatidic acid compound represented by formula (1-2) wherein $R^1$ represents alkyl, arylalkyl, or aryl:

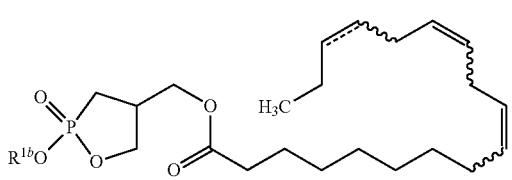

(1-2)

wherein $R^{1b}$ represents alkyl, arylalkyl, or aryl; bonds indicated by solid and dotted lines represent single or double bonds; wavy lines represent single bonds; and when the single bond is adjacent to a double bond, the steric configuration is E-configuration, Z-configuration, or any mixture thereof; is useful as an intermediate for synthesizing the carbacyclic phosphatidic acid compound represented by formula (1-1), as can be understood from the production method described later.

2. Method for Producing Carbacyclic Phosphatidic Acid Compound

The method for producing the carbacyclic phosphatidic acid compound of the present invention is not particularly limited, but preferably comprises step (A) of reacting a cyclic phosphonic acid compound represented by formula (3):

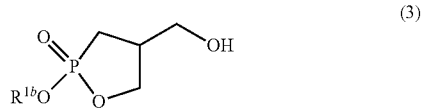

(3)

wherein $R^{1b}$ represents alkyl, arylalkyl, or aryl; and a linoleic acid compound and/or a linolenic acid compound to obtain a carbacyclic phosphatidic acid compound represented by formula (1-2):

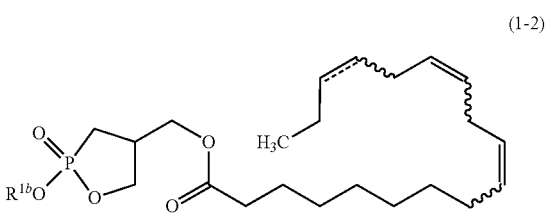

(1-2)

wherein $R^{1b}$ is as defined above; bonds indicated by solid and dotted lines represent single or double bonds; wavy lines represent single bonds; and when the single bond is adjacent to a double bond, the steric configuration is E-configuration, Z-configuration, or any mixture thereof.

(2-1) Step (A)

In step (A), the cyclic phosphonic acid compound represented by formula (3) used as a starting material compound can be a known or commercially available product, or can be synthesized according to a known method. For example, the compound can be synthesized according to steps (A), (B), (C), (D), (E), and (F) described in WO2016/024605. In this case, step (B') described in WO2016/024605 can be used in place of steps (B) and (C).

Specifically, step (A) is a step of reacting the cyclic phosphonic acid compound represented by formula (3) and a linoleic acid compound and/or a linolenic acid compound to obtain the carbacyclic phosphatidic acid compound represented by formula (1-2) (esterification step). A known esterification reaction can be suitably applied. When a linoleic acid compound is used, the carbacyclic phosphatidic acid compound represented by formula (1-a) can be synthesized, and when a linolenic acid compound is used, the carbacyclic phosphatidic acid compound represented by formula (1-b) can be synthesized.

Examples of the linoleic acid compound include linoleic acid and linoleic acid derivatives, such as linoleic acid halides, linoleic anhydride, and linoleic acid esters. These linoleic acid compounds can be used singly or in a combination of two or more.

Examples of the linolenic acid compound include linolenic acid and linolenic acid derivatives, such as linolenic acid halides, linolenic anhydride, and linolenic acid esters. These linolenic acid compounds can be used singly or in a combination of two or more.

Examples of the halide of the linoleic acid halide or linolenic acid halide used in step (A) include chlorine, bromine, iodine, and the like. The halide is particularly preferably chlorine, in terms of ease of synthesis.

Examples of the ester of the linoleic acid ester or linolenic acid ester used in step (A) include methyl ester, ethyl ester, and the like.

The amount of the linoleic acid compound and/or linolenic acid compound used is not particularly limited, and is, for example, preferably 1 to 2 moles, and more preferably 1 to 1.5 moles, per mole of the cyclic phosphonic acid compound represented by formula (3), in terms of ease of synthesis. When several linoleic acid compounds and/or linolenic acid compounds are used, it is preferable to adjust the total amount thereof within the above range.

Specific examples of step (A) include:
- a reaction of the cyclic phosphonic acid compound represented by formula (3) and linoleic acid and/or linolenic acid in the presence of a condensation agent and optionally a base (step A-1);
- a reaction of the cyclic phosphonic acid compound represented by formula (3) and a linoleic acid halide and/or a linolenic acid halide in the presence of a base (step A-2);
- a reaction of the cyclic phosphonic acid compound represented by formula (3) and linoleic anhydride and/or linolenic anhydride (step A-3); and
- a reaction of the cyclic phosphonic acid compound represented by formula (3) and a linoleic acid ester and/or a linolenic acid ester (step A-4).

Any known condensation agent can be used in step A-1 without limitation. Examples of the condensation agent include dicyclohexyl carbodiimide (DCC), diisopropyl carbodiimide (DIC), 1-ethyl-3-(3-dimethylaminopropyl)carbodiimide hydrochloride (EDC), 2-chloro-1-methylpyridinium iodide (CQPI), (benzotriazol-1-yl-oxy)tripyrrolidinophosphonium hexafluorophosphate (pyBOP), O-(7-azabenzotriazol-1-yl)-N,N,N,N-tetramethyluronium hexafluorophosphate (HATU), O-(benzotriazol-1-yl)-N,N,N,N-tetramethyluronium hexafluorophosphate (HBTU), (1-cyano-2-ethoxy-2-oxoethylidenaminooxy)dimethylamino morpholino carbenium hexafluorophosphate (COMU), and the like.

The linoleic acid halide and/or linolenic acid halide used in step A-2 may be supplied as a halide, or the linoleic acid halide and/or linolenic acid halide may be synthesized from linoleic acid and/or linolenic acid in the reaction system.

The base used in steps A-1 and A-2 is not particularly limited, and examples include organic bases, such as triethylamine, pyridine, N,N-diethylaniline, 4-dimethylaminopyridine (DMAP), and diisopropylethylamine.

The linoleic anhydride and/or linolenic anhydride used in step A-3 may be supplied as anhydride, or the linoleic anhydride and/or linolenic anhydride may be synthesized from linoleic acid and/or linolenic acid in the reaction system.

The condensation agent and base described above can be suitably selected depending on the type of linoleic acid compound or linolenic acid compound. The condensation agents and bases can be used singly or in a combination of two or more. Further, the condensation agent or base can be used in any amount within the range of generally 0.25 moles to an excess amount, and in terms of ease of synthesis, preferably 0.5 to 2 moles per mole of the cyclic phosphonic acid compound represented by formula (3). When several condensation agents and bases are used, it is preferable to adjust the total amount thereof within the above range.

The other conditions are not particularly limited. Specifically, step (A) can be performed in an inert gas atmosphere, such as nitrogen or argon. The reaction pressure is not particularly limited, and the reaction can be performed under ordinary pressure or increased pressure. The reaction temperature is generally preferably 0 to 120° C., more preferably 0 to 30° C., and even more preferably 15 to 25° C. The reaction time is generally preferably 0.1 to 100 hours, more preferably 0.5 to 50 hours, and even more preferably 2 to 17 hours.

After completion of the reaction, from the obtained reaction mixture, an excess amount of the reagent (the linoleic acid compound, the linolenic acid compound, etc.), the unreacted starting material compound, and other components are removed by a typical separation technique, such as liquid separation, concentration, and column purification, to isolate the target carbacyclic phosphatidic acid compound represented by formula (1-2). When $R^1$ is hydrogen or alkali metal, after completion of the reaction, only liquid separation and concentration may be performed, and the mixture obtained after reaction may be used as it is in step (B) without performing purification and isolation steps (Telescoping synthesis).

(2-2) Step (B)

Step (B) is a step of performing a deesterification reaction in the phosphoric acid ester moiety of the carbacyclic phosphatidic acid compound represented by formula (1-2) produced in step (A) to obtain a carbacyclic phosphatidic acid compound represented by formula (1-1):

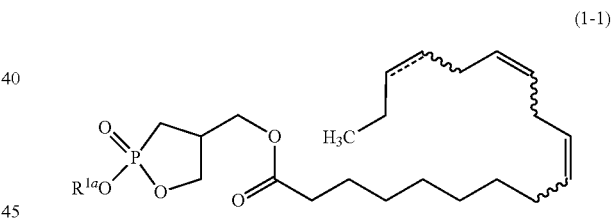

(1-1)

wherein $R^{1a}$ represents hydrogen or alkali metal; bonds indicated by solid and dotted lines represent single or double bonds; wavy lines represent single bonds; and when the single bond is adjacent to a double bond, the steric configuration is E-configuration, Z-configuration, or any mixture thereof.

For the deesterification reaction, a generally known deesterification reaction of a phosphoric acid ester may be applied; however, when the carbacyclic phosphatidic acid compound represented by formula (1-1) is later obtained as a crystal, it is preferable to use an alkali metal halide in this reaction to obtain the carbacyclic phosphatidic acid compound represented by formula (1-1).

Specifically, step (B) is a step of reacting the carbacyclic phosphatidic acid compound represented by formula (1-2) and an alkali metal halide, for example, in an organic solvent to obtain the carbacyclic phosphatidic acid compound represented by formula (1-1).

As the alkali metal halide used in step (B), a wide range of known alkali metal halides can be used. Examples include sodium fluoride, sodium chloride, sodium bromide, sodium iodide, potassium fluoride, potassium chloride, potassium bromide, potassium iodide, lithium fluoride, lithium chloride, lithium bromide, lithium iodide, and the like. Of these, in terms of ease of synthesis, sodium halide is preferable, and sodium iodide is more preferable. The alkali metal halides can be used singly or in a combination of two or more.

The amount of the alkali metal halide used is generally 1 to 5 moles, and in terms of ease of synthesis, preferably 1 to 3 moles, and more preferably 1 to 1.5 moles, per mole of the carbacyclic phosphatidic acid compound represented by formula (1-2).

Step (B) is preferably performed in the presence of an organic solvent. The organic solvent used in step (B) is not particularly limited, as long as the solvent does not adversely affect the reaction. Examples of the organic solvent used include ketone solvents (e.g., branched or linear ketones and cyclic ketones, such as acetone, methyl ethyl ketone, methyl isobutyl ketone, diisobutyl ketone (DIBK), and cyclohexanone), alcohol solvents (e.g., methanol and ethanol), ether solvents (e.g., diethyl ether, diisopropyl ether, tetrahydrofuran (THF), and 1,4-dioxane), aromatic hydrocarbon solvents (e.g., benzene, toluene, and xylene), aliphatic or alicyclic hydrocarbon solvents (e.g., n-pentane, n-hexane, cyclohexane, and petroleum ether), ester solvents (e.g., ethyl acetate), halogenated hydrocarbon solvents (e.g., methylene chloride, chloroform, and 1,2-dichloroethylene), and the like. The organic solvents can be used singly or in a combination of two or more. Of these organic solvents, in terms of ease of synthesis, ketone solvents are preferable; and acetone, methyl ethyl ketone, methyl isobutyl ketone, etc. are particularly preferable.

The amount of the organic solvent used can be suitably selected from a wide range. For example, the amount of the organic solvent is generally preferably 2 to 20 liters, and more preferably 2 to 5 liters, per mole of the carbacyclic phosphatidic acid compound represented by formula (1-2).

The other conditions are not particularly limited. Specifically, step (B) can be performed in an inert gas atmosphere, such as nitrogen or argon. The reaction pressure is not particularly limited, and the reaction can be performed under ordinary pressure or increased pressure. The reaction temperature is generally preferably 0 to 120° C., more preferably 50 to 120° C., and even more preferably 70 to 120° C. The refluxing temperature is most preferable. The reaction time is generally preferably 0.1 to 100 hours, more preferably 0.5 to 50 hours, and even more preferably 1 to 24 hours.

After completion of the reaction, from the obtained reaction mixture, an excess amount of the reagent (e.g., the alkali metal halide), the unreacted starting material compound, and other components are removed by a typical separation technique, such as concentration, crystallization, and filtration, to isolate the target carbacyclic phosphatidic acid compound represented by formula (1-1).

The carbacyclic phosphatidic acid compound represented by formula (1-1) obtained by using an alkali metal halide is produced as a salt wherein $R^{1a}$ is alkali metal.

Therefore, when producing a carbacyclic phosphatidic acid compound represented by formula (1-1) wherein $R^{1a}$ is hydrogen, it is preferable to react an acid, such as a hydrogen halide, with the carbacyclic phosphatidic acid compound represented by formula (1-1) wherein $R^{1a}$ is alkali metal.

As the hydrogen halide used, a wide range of known hydrogen halides can be used. Examples include hydrogen fluoride, hydrogen chloride, hydrogen bromide, hydrogen iodide, and the like. The hydrogen halides can be used singly or in a combination of two or more.

The amount of the acid, such as a hydrogen halide, used is not particularly limited, as long as it is 1 equivalent or more per equivalent of the carbacyclic phosphatidic acid compound represented by formula (1-1) wherein $R^{1a}$ is alkali metal, and generally preferably 1.2 equivalents or more.

In this reaction, the isolated carbacyclic phosphatidic acid compound represented by formula (1-1) wherein $R^{1a}$ is alkali metal may be redissolved in a suitable solvent and reacted with an acid, such as a hydrogen halide; however, an acid, such as a hydrogen halide, may be added to a reaction liquid for producing the carbacyclic phosphatidic acid compound represented by formula (1-1) wherein $R^{1a}$ is alkali metal.

Examples of usable solvents include water, in addition to organic solvents that can be used in the above deesterification reaction.

The other conditions are not particularly limited. Specifically, step (B) can be performed in an inert gas atmosphere, such as nitrogen or argon. The reaction pressure is not particularly limited, and the reaction can be performed under ordinary pressure or increased pressure. The reaction temperature may be generally −20° C. to 120° C., preferably 0 to 50° C., and more preferably about 5 to 40° C. The reaction time is generally several seconds to about 1 hour, and preferably about 0.5 to 30 minutes.

After completion of the reaction, isolation is performed by a typical separation technique, such as liquid separation, concentration, crystallization, and filtration, to obtain the target carbacyclic phosphatidic acid compound represented by formula (1-1) ($R^{1a}$=hydrogen).

(2-3) Step (C)

When the carbacyclic phosphatidic acid compound represented by formula (1-1) (in particular, the compound wherein $R^{1a}$ is alkali metal) is isolated as a crystal, it is preferable to perform, after the deesterification reaction in step (B), step (C) of precipitating a crystal by concentrating a solution containing the carbacyclic phosphatidic acid compound represented by formula (1-1) under reduced pressure (step C-1), or cooling the solution containing the carbacyclic phosphatidic acid compound represented by formula (1-1) (step C-2).

The reduced pressure in step C-1 is not particularly limited, as long as the crystal can be precipitated under the pressure. The reduced pressure is generally lower than the atmospheric pressure.

The cooling temperature in step C-2 is not particularly limited, as long as the crystal can be precipitated at the temperature. The cooling temperature is generally lower than the temperature of the solution after the reaction in step (B), and preferably 0 to 50° C., and more preferably 10 to 40° C.

The cooling time is not particularly limited, and generally 0.1 to 100 hours, preferably 0.2 to 50 hours, and more preferably 0.5 to 2 hours.

In step (C), steps C-1 and C-2 can be performed in combination. Specifically, after step C-1 of concentrating a solution containing the carbacyclic phosphatidic acid compound under reduced pressure, step C-2 can be performed to redissolve the obtained carbacyclic phosphatidic acid compound represented by formula (1-1) in the organic solvent described above.

(2-4) Steps (D) and (E)

After the crystal is obtained in step (C), further step (D) can be performed to dissolve the crystal obtained in step (C) in water and/or an organic solvent, and step (E) can be performed to add a poor solvent to the solution obtained in step (D) and perform recrystallization.

The water and/or organic solvent used in step (D) can be any water and/or organic solvent that can dissolve the crystal obtained in step (C). Examples of the organic solvent include alcohol solvents, and in particular, methanol, ethanol, 1-propanol, isopropyl alcohol, and 1-butanol are preferable.

The amount of the water and/or organic solvent used can be suitably selected from a wide range. For example, the amount of the water and/or organic solvent is generally 0.5 to 20 liters, and preferably 0.5 to 2 liters, per mole of the carbacyclic phosphatidic acid compound represented by formula (1-1).

In the use of a mixture solvent of water and an organic solvent, the mixing ratio is not particularly limited. The mixing ratio of water to an organic solvent is preferably 1:99 to 99:1, and more preferably 30:70 to 70:30.

The temperature at which the crystal is dissolved is not particularly limited, and is generally 0 to 100° C., preferably 10 to 80° C., and more preferably 20 to 60° C.

The time period for step (D) is not particularly limited, and is generally 0.1 to 100 hours, preferably 0.5 to 50 hours, and more preferably 1 to 2 hours.

The poor solvent used in step (E) may be any solvent that can precipitate a crystal from the solution obtained in step (D). Specifically, the poor solvent can be any solvent that is poorer than the solvent used in step (D) (good solvent). Examples of poor solvents include ketone solvents (e.g., acetone, methyl ethyl ketone, and methyl isobutyl ketone), ether solvents (e.g., diethyl ether, diisopropyl ether, tetrahydrofuran (THF), and 1,4-dioxane), aromatic hydrocarbon solvents (e.g., benzene, toluene, and xylene), aliphatic or alicyclic hydrocarbon solvents (e.g., n-pentane, n-hexane, cyclohexane, and petroleum ether), ester solvents (e.g., methyl acetate, ethyl acetate, isopropyl acetate, and butyl acetate), halogenated hydrocarbon solvents (e.g., methylene chloride, chloroform, and 1,2-dichloroethylene), and alcohol solvents having 3 or more carbon atoms (e.g., 1-propanol).

The solvent used in step (E) may be any solvent that is poorer than the solvent used in step (D) (good solvent). For example, if the solvent used in step (D) is methanol, an alcohol solvent having 3 or more carbon atoms (e.g., 1-propanol) can be used as a poor solvent. The organic solvents can be used singly or in a combination of two or more. Of these organic solvents, ketone solvents are preferable, and in particular, acetone, methyl ethyl ketone, and methyl isobutyl ketone are preferable.

The amount of the poor solvent used can be suitably selected from a wide range. For example, the amount of the poor solvent is generally 1 to 30 liters, and preferably 2 to 5 liters, per mole of the carbacyclic phosphatidic acid compound represented by formula (1-1).

The temperature at which the poor solvent is added is generally −20° C. to 30° C., preferably −10° C. to 20° C., and more preferably 0° C. to 20° C.

The crystal of the carbacyclic phosphatidic acid compound represented by formula (1-1) obtained in step (E) has advantages in its high purity and excellent storage stability, as well as its capacity to stabilize cyclic phosphonic acid compounds.

3. Degradation Inhibitor and Composition

Among the carbacyclic phosphatidic acid compounds of the present invention, the carbacyclic phosphatidic acid compound represented by formula (1-1) wherein $R^1$ represents hydrogen or alkali metal is useful as a degradation inhibitor.

In particular, the carbacyclic phosphatidic acid compound represented by formula (1-1) is useful because it can inhibit the degradation of cyclic phosphonic acid compounds, particularly a cyclic phosphonic acid compound represented by formula (2):

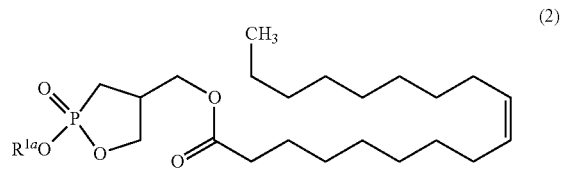

wherein $R^{1a}$ represents hydrogen or alkali metal.

Specifically, the carbacyclic phosphatidic acid compound represented by formula (1-1) can be allowed to coexist with a cyclic phosphonic acid compound (in particular, the cyclic phosphonic acid compound represented by formula (2)) to thereby inhibit the degradation of the cyclic phosphonic acid compound.

In this case, the form of the cyclic phosphonic acid compound is not particularly limited, and examples include liquids, solids, crystals, and the like. Of these, crystals are preferable in terms of stability etc.

When the cyclic phosphonic acid compound represented by formula (2) is obtained as a crystal, it is preferably synthesized according to the method described in WO2016/024605. Specifically, it can be synthesized in the same manner as described in the "Method for Producing Carbacyclic Phosphatidic Acid Compound" section above, except that an oleic acid compound is used in place of a linoleic acid compound and/or a linolenic acid compound. As a result, the compound can be obtained as a very high-purity crystal.

Examples of the oleic acid compound that can be used therein include oleic acid and oleic acid derivatives, such as oleic acid halides, oleic anhydride, and oleic acid esters. For the halides and esters, the above explanation can be directly applied. These oleic acid compounds can be used singly or in a combination of two or more.

Even a high-purity crystal of the cyclic phosphonic acid compound represented by formula (2) rapidly degrades when stored mainly in the air or under high temperature. The carbacyclic phosphatidic acid compound represented by formula (1-1) can inhibit this degradation, and is thus useful as a degradation inhibitor.

The method for inhibiting the degradation of the cyclic phosphonic acid compound represented by formula (2) is not particularly limited. Specifically, a composition comprising the carbacyclic phosphatidic acid compound represented by formula (1-1) and the cyclic phosphonic acid compound represented by formula (2) can be formed to thereby inhibit the degradation of the cyclic phosphonic acid compound represented by formula (2).

In the above composition, the content of the carbacyclic phosphatidic acid compound represented by formula (1-1) is not particularly limited. Specifically, the content of the carbacyclic phosphatidic acid compound represented by formula (1-1) based on 100 parts by mass of the cyclic phosphonic acid compound represented by formula (2) can be preferably 0.001 parts by mass or more, more preferably 0.003 parts by mass or more, and even more preferably 0.01 parts by mass or more, and can be preferably less than 0.45 parts by mass, more preferably 0.4 parts by mass or less, and even more preferably 0.35 parts by mass or less. When the content of the carbacyclic phosphatidic acid compound represented by formula (1-1) is set in this range, the degradation of the cyclic phosphonic acid compound represented by formula (2) can be effectively inhibited even with a very small amount of the carbacyclic phosphatidic acid compound represented by formula (1-1). The composition includes one obtained by intentionally mixing the carbacyclic phosphatidic acid compound represented by formula (1-1) and the cyclic phosphonic acid compound represented by formula (2), and one obtained in such a manner that in the synthesis of the carbacyclic phosphatidic acid compound represented by formula (1-1) or the cyclic phosphonic acid compound represented by formula (2), the other is synthesized as a by-product.

The form of the composition is not particularly limited, and may be a liquid, a solid, or a crystal, but is preferably a crystal in terms of stability. Further, when obtaining the composition, various methods and devices can be used to obtain a homogeneous mixture. For example, when the cyclic phosphonic acid compound (in particular, the cyclic phosphonic acid compound represented by formula (2)) is a crystal, the carbacyclic phosphatidic acid compound represented by formula (1-1) and the cyclic phosphonic acid compound (in particular, the cyclic phosphonic acid compound represented by formula (2)) can be directly mixed, or the carbacyclic phosphatidic acid compound represented by formula (1-1) can be added while the cyclic phosphonic acid compound (in particular, the cyclic phosphonic acid compound represented by formula (2)) is dissolved or suspended in a solvent, followed by crystallization. The crystallization method can be performed according to steps (C), (D), and (E) described above.

The composition can be generally used for applications to which the cyclic phosphonic acid compound represented by formula (2) is applied, for example, as a pharmaceutical composition such as an anti-cancer agent because of its infiltration-inhibitory activity on cancer cells, an osteoarthritis therapeutic agent because of its accelerated production of hyaluronic acid, or a hair growth agent.

EXAMPLES

The present invention is described in further detail below with reference to Examples and Comparative Examples. However, the present invention is not limited to the following Examples.

In the Examples and Comparative Examples, the starting material compound, (2-methoxy-2-oxo-2$\lambda^5$-[1.2]oxaphosphoran-4-yl)methanol (compound 3a), was synthesized according to steps B, C, D, E, and F in Synthesis Example G5 of WO2016/024605.

Further, the sodium salt of 9-octadecenoic acid(9Z)-(2-hydroxy-2-oxo-2$\lambda^5$-1,2-oxaphosphoran-4-yl)methyl ester (2ccPA) used in Test Example 1 was synthesized according to Example 2 of WO2016/024605.

Example 1

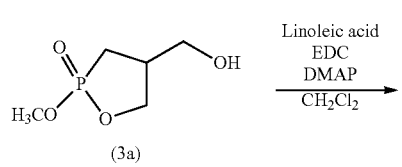
(3a)

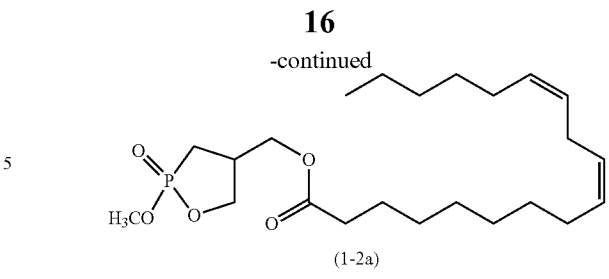
(1-2a)

In the formula, EDC represents 1-ethyl-3-(3-dimethylaminopropyl) carbodiimide hydrochloride. DMAP represents 4-dimethylaminopyridine.

500.0 mg (3.01 mmol) of (2-methoxy-2-oxo-2$\lambda^5$-[1.2] oxaphosphoran-4-yl)methanol (compound 3a) was dissolved in 5.7 mL of dichloromethane. Further, 840.0 mg (3.01 mmol) of linoleic acid and 109.9 mg (0.90 mmol) of 4-dimethylaminopyridine (DMAP) were added, and the mixture was cooled to 0° C. Then, 690.0 mg (3.62 mmol) of 1-ethyl-3-(3-dimethylaminopropyl)carbodiimide hydrochloride (EDC) was added to the resulting solution, and the mixture was stirred at room temperature for 3 hours. The reaction was stopped with 2.2 mL of 1 N hydrochloric acid, and after liquid separation, extraction was performed with 2 mL of dichloromethane, and again with 2 mL of dichloromethane. The organic phase was washed with 2 mL of water, and again with 2 mL of water. Then, the dichloromethane was distilled off under reduced pressure, and purification was performed by silica gel chromatography (ethyl acetate:hexane) to obtain 1.05 g (2.45 mmol) of a carbacyclic phosphatidic acid compound (compound 1-2a; $C_{23}H_{41}O_5P$) with a yield of 81%. It was confirmed by $^1$H NMR, $^{13}$C NMR, IR, and LC/MS that the target product was obtained.

$^1$H NMR (500 MHz ClCD$_3$)

0.89 (t, J=6.9 Hz, 3H), 1.28-1.35 (m, 14H), 1.60-1.73 (m, 3H), 2.02-2.08 (m, 5H), 2.31 (t, J=7.6 Hz, 2H), 2.77 (t, 6.6 Hz, 2H), 2.89-3.00 (m, 1H), 3.78-4.33 (m, 7H), 5.32-5.37 (m, 4H).

$^{13}$C NMR (500 MHz ClCD$_3$)

14.3, 21.4, 22.4, 22.9, 25.1, 25.9, 27.1, 29.4, 29.5, 29.6, 29.9, 31.8, 34.3, 36.7, 36.9, 53.0, 64.2, 68.8, 128.2, 128.4, 130.3, 130.5, 173.7

IR 588, 724, 823, 857, 1001, 1044, 1170, 1266, 1358, 1460, 1651, 1737, 2855, 2925, 3007, 3463 cm$^{-1}$

LC/MS

Calcd; [M+H]$^+$ 429.28.

Found; 429.2.

Example 2

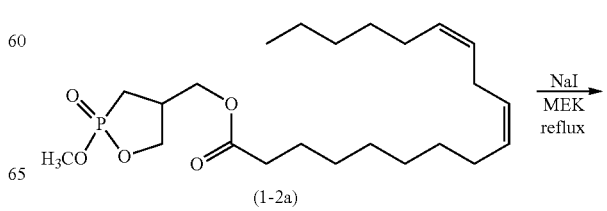
(1-2a)

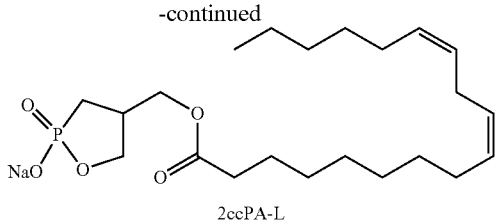

2ccPA-L

In the formula, MEK represents methyl ethyl ketone.

1.03 g (2.40 mmol) of the carbacyclic phosphatidic acid compound (compound 1-2a) obtained in Example 1 was dissolved in 9.1 mL of methyl ethyl ketone. 540.0 mg (3.60 mmol) of sodium iodide was added thereto, and the mixture was allowed to react under heating at reflux for 10 hours. After the reaction, the reaction liquid was concentrated, then dissolved in 2.5 mL of methanol at 40° C., and cooled to 30° C. Thereafter, 5.1 mL of acetone was added dropwise to this solution. After cooling to 15° C., 5.1 mL of acetone was added dropwise, and the mixture was aged for 1 hour. Then, the resulting crystal was filtered, washed with 11.2 mL of acetone, and dried under reduced pressure to obtain 779.0 mg (1.79 mmol) of a carbacyclic phosphatidic acid compound (2ccPA-L; $C_{22}H_{39}NaO_5P$) crystal with a purity of 95.6%. It was confirmed by $^1$H NMR, $^{13}$C NMR, IR, and LC/MS that the target product was obtained. LC/MS confirmed a hydrogenated carbacyclic phosphatidic acid as follows because a buffer was used as an eluent.

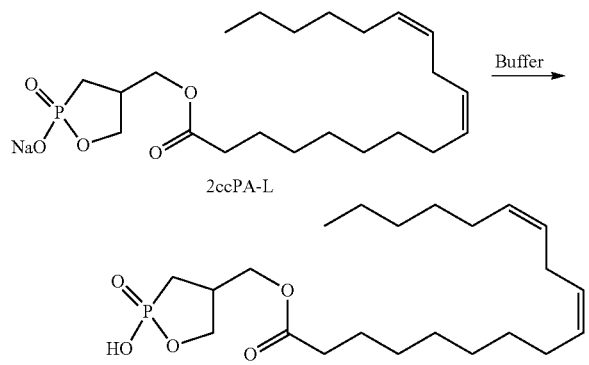

$^1$H NMR (500 MHz D$_2$O)

0.88 (t, J=6.8, 3H), 1.28-1.35 (m, 15H), 1.41-1.49 (m, 2H), 1.60 (br, 2H), 1.85-1.92 (m, 1H), 2.02-2.05 (t, J=6.8, 3H), 2.33-3.36 (t, J=7.7, 2H), 2.73-2.77 (m, 2H), 2.80-2.85 (m, 1H), 3.75-3.80 (m, 1H), 4.06-4.20 (m, 3H), 5.26-5.38 (m, 3H)

$^{13}$C NMR (500 MHz D$_2$O)

13.9, 22.2, 22.5, 23.2, 24.7, 25.5, 27.1, 27.2, 28.2, 29.2, 29.3, 29.7, 31.4, 33.8, 36.8, 65.6, 67.2, 127.8, 127.9, 129.7, 129.8, 179.8

IR 592, 744, 776, 854, 1017, 1099, 1209, 1461, 1732, 2856, 2924, 3008, 3300 cm$^{-1}$

LC/MS

Chemical Formula: $C_{22}H_{39}O_5P$

Calcd; [M+H]$^+$ 415.26.

Found; 415.2.

Melting Point

139° C.

Comparative Example 1

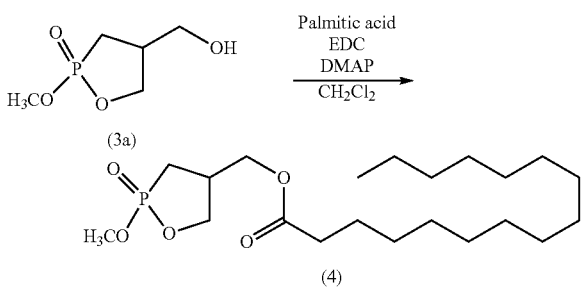

In the formula, EDC represents 1-ethyl-3-(3-dimethylaminopropyl) carbodiimide hydrochloride. DMAP represents 4-dimethylaminopyridine.

1.0 g (6.02 mmol) of (2-methoxy-2-oxo-2λ$^5$-[1.2]oxaphosphoran-4-yl)methanol (compound 3a) was dissolved in 11.2 mL of dichloromethane, and 1.54 g (6.02 mmol) of palmitic acid and 220.0 mg (7.22 mmol) of 4-dimethylaminopyridine (DMAP) were further added thereto, followed by cooling to 0° C. Thereafter, 1.38 g (1.81 mmol) of 1-ethyl-3-(3-dimethylaminopropyl)carbodiimide hydrochloride (EDC) was added to this solution, and the mixture was stirred at room temperature for 3 hours. The reaction was stopped with 4.4 mL of 1 N hydrochloric acid, and after liquid separation, extraction was performed with 4 mL of dichloromethane, and again with 4 mL of dichloromethane. The organic phase was washed with 4 mL of water, and again with 4 mL of water. Thereafter, the dichloromethane was distilled off under reduced pressure, and purification was performed by silica gel chromatography (ethyl acetate: hexane) to obtain 1.72 g (4.25 mmol) of a phosphonic acid ester compound (compound 4; $C_{21}H_{41}O_5P$) with a yield of 71%. It was confirmed by $^1$H NMR that the target product was obtained.

$^1$H NMR (500 MHz ClCD$_3$)

0.89 (t, J=7.0 Hz, 3H), 1.25 (br, 24H), 1.54-1.76 (m, 3H), 1.98-2.05 (m, 1H), 2.31 (t, J=7.6 Hz, 2H), 2.84-2.90 (m, 1H), 3.78-3.81 (m, 3H), 3.94-4.23 (m, 4H).

Comparative Example 2

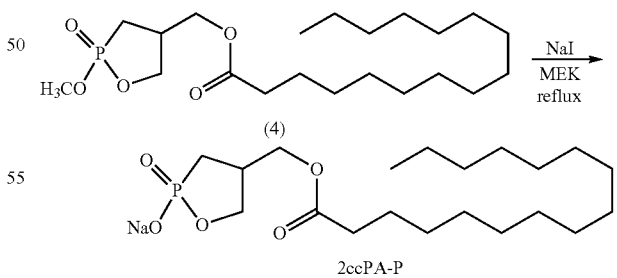

In the formula, MEK represents methyl ethyl ketone.

1.72 g (4.25 mmol) of the phosphonic acid ester compound (compound 4) obtained in Comparative Example 1 was dissolved in 15.1 mL of methyl ethyl ketone, and 960.0 mg (6.38 mmol) of sodium iodide was added thereto, and the mixture was allowed to react under heating at reflux for 15 hours. After the reaction, the reaction liquid was concentrated, then dissolved in 4.5 mL of methanol at 40° C., and cooled to 30° C. Then, 30 mL of acetone was added dropwise to this solution. After cooling to 15° C., 30 mL of acetone was added dropwise, and the mixture was aged for 1 hour. Thereafter, the resulting crystal was filtered, washed with 30 mL of acetone, and dried under reduced pressure to obtain 1.09 g (2.64 mmol) a carbacyclic phosphatidic acid compound (2ccPA-P; $C_{20}H_{38}NaO_5P$) crystal with a purity of 93.2%. It was confirmed by $^1H$ NMR, $^{13}C$ NMR, IR, and LC/MS that the target product was obtained. LC/MS confirmed a hydrogenated carbacyclic phosphatidic acid as follows because a buffer was used as an eluent.

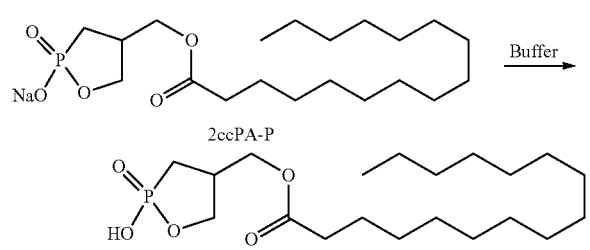

$^1H$ NMR (500 MHz $CD_3OD$)
0.90 (t, J=6.3 Hz, 3H), 1.29-1.43 (m, 25H), 1.59-1.62 (m, 2H), 1.74-1.81 (m, 1H), 2.33 (t, J=7.4 Hz, 2H), 2.76-2.80 (m, 1H), 3.68-3.73 (m, 1H), 4.04-4.15 (m, 3H)
$^{13}C$ NMR (500 MHz $CD_3OD$)
15.3, 24.6, 24.8, 25.8, 26.9, 29.1, 31.1, 31.2, 31.3, 31.4, 31.5, 31.6, 33.9, 35.8, 39.4, 39.5, 41.3, 67.4, 68.5, 176.2
IR
461, 583, 743, 773, 858, 1018, 1100, 1167, 1206, 1412, 1469, 1678, 1732, 2076, 2850, 2916, 3300, 3459 $cm^{-1}$
LC/MS
Chemical Formula: $C_{20}H_{39}O_5P$
Calcd; $[M+H]^+$ 391.26.
Found; 391.2.
Melting point
186° C.

Test Example 1

(1) Test Samples
2ccPA-L of Example 2 or 2ccPA-P of Comparative Example 2 was added to 2ccPA, and a stability test was performed.
Control: 2ccPA crystal
Test substances: crystals obtained by adding 2ccPA-L or 2ccPA-P at each concentration to 2ccPA, followed by crystallization with methanol and acetone.
(2) Execution Conditions
In the stability test, a thermo-hygrostat (Yamato Scientific Co., Ltd., IW223) was used. The stability test was performed while maintaining a set temperature of 40° C. and a set humidity of 60%.
(3) Analysis
The sample purity was confirmed in such a manner that about 10 mg of each sample was weighed every week and diluted with 2 mL of acetonitrile/water (volume ratio: 1/1), and the diluted solution was analyzed by high-performance liquid chromatography (Shimadzu LC20AD).
The results are shown in Table 1 (Example 2) and Table 2 (Comparative Example 2). Tables 1 and 2 focus only on 2ccPA, and show the residual rate thereof with the initial content of 2ccPA as 100 mass %.

TABLE 1

| 2ccPA-L (mass %) | Stability test (1 week) | Stability test (2 weeks) |
| --- | --- | --- |
| 0 | 100% | 94.4% |
| 0.03 | 100% | 100% |
| 0.08 | 100% | 100% |
| 0.12 | 100% | 99.64% |
| 0.20 | 100% | 100% |
| 0.30 | 100% | 99.98% |

TABLE 2

| 2ccPA-P (mass %) | Stability test (1 week) |
| --- | --- |
| 0 | 100% |
| 0.15 | 92.62% |

As shown in Table 1, when the 2ccPA-L of the present invention was allowed to coexist with 2ccPA, the purity of 2ccPA was hardly reduced even after storage for a long period of time (e.g., 1 or 2 weeks), and 2ccPA crystals with improved stability were obtained.

On the other hand, as shown in Table 2, when 0.15 mass % of 2ccPA-P was added to 2ccPA, the purity was reduced, and the stability of the 2ccPA crystal instead deteriorated.

The invention claimed is:
1. A carbacyclic phosphatidic acid compound represented by formula (1):

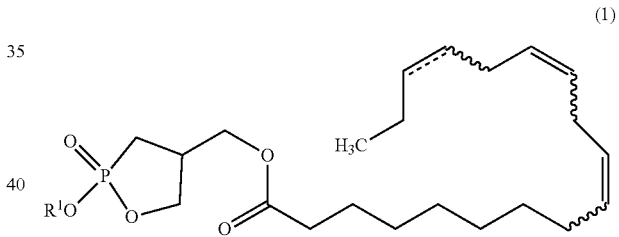

(1)

wherein $R^1$ represents hydrogen, alkali metal, alkyl, arylalkyl, or aryl; bonds indicated by solid and dotted lines represent single or double bonds; wavy lines represent single bonds; and when the single bond is adjacent to a double bond, the steric configuration is E-configuration, Z-configuration, or any mixture thereof.

2. The carbacyclic phosphatidic acid compound according to claim 1, which is represented by formula (1A):

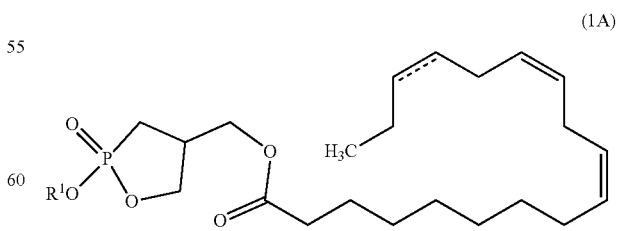

(1A)

wherein $R^1$ is as defined in claim 1, and bonds indicated by solid and dotted lines represent single or double bonds.

3. The carbacyclic phosphatidic acid compound according to claim 1, wherein $R^1$ represents hydrogen or alkali metal.

4. A method for producing the carbacyclic phosphatidic acid compound according to claim 1, the method comprising step (A) of reacting a cyclic phosphonic acid compound represented by formula (3):

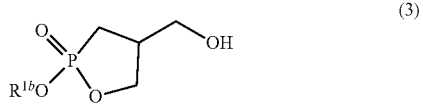
(3)

wherein $R^{1b}$ represents alkyl, arylalkyl, or aryl; and a linoleic acid compound and/or a linolenic acid compound to obtain a carbacyclic phosphatidic acid compound represented by formula (1-2):

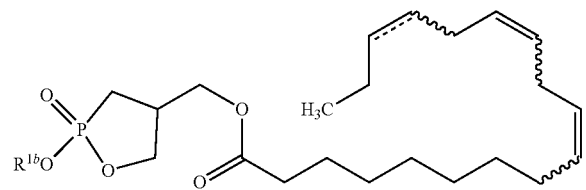
(1-2)

wherein $R^{1b}$ is as defined above; bonds indicated by solid and dotted lines represent single or double bonds; wavy lines represent single bonds; and when the single bond is adjacent to a double bond, the steric configuration is E-configuration, Z-configuration, or any mixture thereof.

5. The production method according to claim 4, further comprising step (B) of reacting the carbacyclic phosphatidic acid compound represented by formula (1-2) and an alkali metal halide to obtain a carbacyclic phosphatidic acid compound represented by formula (1-1):

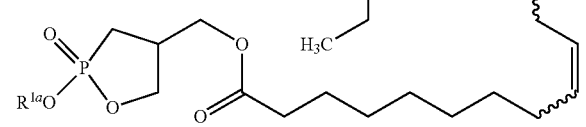
(1-1)

wherein $R^{1a}$ represents hydrogen or alkali metal; bonds indicated by solid and dotted lines represent single or double bonds; wavy lines represent single bonds; and when the single bond is adjacent to a double bond, the steric configuration is E-configuration, Z-configuration, or any mixture thereof.

6. A degradation inhibitor comprising the carbacyclic phosphatidic acid compound according to claim 3.

7. A composition comprising:
a carbacyclic phosphatidic acid compound represented by formula (1-1):

(1-1)

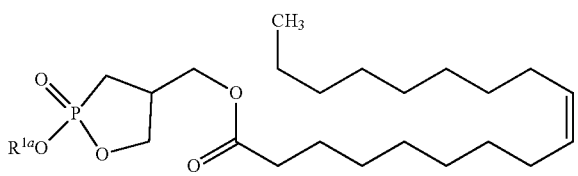

wherein $R^{1a}$ represents hydrogen or alkali metal; bonds indicated by solid and dotted lines represent single or double bonds; wavy lines represent single bonds; and when the single bond is adjacent to a double bond, the steric configuration is E-configuration, Z-configuration, or any mixture thereof; and
a cyclic phosphonic acid compound represented by formula (2):

(2)

wherein $R^{1a}$ is as defined above.

8. The composition according to claim 7, wherein the carbacyclic phosphatidic acid compound is contained in an amount of 0.001 to 0.44 parts by mass based on 100 parts by mass of the cyclic phosphonic acid compound.

9. The composition according to claim 7, which is a pharmaceutical composition.

10. The carbacyclic phosphatidic acid compound according to claim 2, wherein $R^1$ represents hydrogen or alkali metal.

11. A degradation inhibitor comprising the carbacyclic phosphatidic acid compound according to claim 10.

12. The composition according to claim 8, which is a pharmaceutical composition.

* * * * *